United States Patent [19]
Chia

[11] Patent Number: 5,394,158
[45] Date of Patent: Feb. 28, 1995

[54] LOCATION DETERMINATION AND HANDOVER IN MOBILE RADIO SYSTEMS

[75] Inventor: Si T. S. Chia, Ipswich, England

[73] Assignee: British Telecommunications public limited company, London, England

[21] Appl. No.: 30,204

[22] PCT Filed: Jul. 25, 1991

[86] PCT No.: PCT/GB91/01242
§ 371 Date: Mar. 22, 1993
§ 102(e) Date: Mar. 22, 1993

[87] PCT Pub. No.: WO92/02105
PCT Pub. Date: Feb. 6, 1992

[30] Foreign Application Priority Data

Jul. 25, 1990 [GB] United Kingdom ............... 9016277

[51] Int. Cl.⁶ .............................................. H04Q 7/04
[52] U.S. Cl. .................................... 342/457; 379/59; 379/60
[58] Field of Search ................ 342/457; 379/59, 60

[56] References Cited

FOREIGN PATENT DOCUMENTS

| | | |
|---|---|---|
| 543725 | 3/1981 | Australia . |
| 17688/88 | 3/1990 | Australia . |
| 0037070 | 10/1981 | European Pat. Off. . |
| 0241954 | 10/1987 | European Pat. Off. . |
| 2621435 | 4/1989 | France . |

OTHER PUBLICATIONS

*IEEE Communications Magazine*, No. 7, Jul. 1989, New York (US), pp. 20–29; Steele: "The Cellular Environment of Lighweight Handheld Portables".

*IEE Proceedings F. Communications Radar and Signal Processing*, No. 1, Feb. 1987, pp. 85–88; Munoz-Rodriguez et al.: "Multiple Criteria For Hand-Off in Cellular Mobile Radio".

*IEEE*, 38th IEEE Vehicular Technology Conference, 15–17, Jun. 1988, Philadelphia, U.S. New York, 1988, pp. 170–175, Kanai et al.: "A Handoff Control Process for Microcellular Systems".

PCT Search Report.

*Primary Examiner*—Mark Hellner
*Attorney, Agent, or Firm*—Nixon & Vanderhye

[57] ABSTRACT

A handover initiation system for a cellular radio network comprises means for determining both the distance of a mobile user from a cell base station based on propagation delay techniques and means for measuring the signal strength to determine the path taken by the mobile user. In a busy area microcells are constituted by single streets. The propagation characteristics of adjoining streets in a larger macrocell can be distinguished from the propagation characteristics of the street constituting the micro-cell such that the handover initiation of a mobile user within one of the surrounding streets can be determined.

20 Claims, 3 Drawing Sheets

LOCATION DETERMINATION AND HANDOVER IN MOBILE RADIO SYSTEMS

BACKGROUND OF THE INVENTION

1. Field of the Invention

This invention relates to a system for determining the location of a mobile unit in a mobile, and in particular cellular, radio system.

2. Related Art

A cellular mobile radio system comprises a number of cells, each having a base station supporting a plurality of communication channels on any of which a user's call is handled until the caller passes out of range. At this point the responsibility for maintaining the call is handed over to one of a number of surrounding cells. The capacity of a cell is limited by the number of channels available. In less densely populated, e.g. rural, areas the size of the cell, which is determined to a large extent by the call concentration, is relatively large. On the other hand, in an area having a high density of mobile users, e.g. the business district of a large city, the call concentration is much greater and the cell size is relatively much smaller.

In any cellular radio system the three phases of handover are (a) deciding which cell is to receive the mobile station, (b) deciding at what point transfer should take place and (c) switching the mobile user from one base station to the other.

In high density traffic situations it has been proposed to overlay a conventional cell (a macrocell) with a network of smaller cells (microcells) created by lower power transmitters. Typically, microcells have only 200 or 500 meters range and often simply constitute a busy street, or part of a street, in which the density of calls is expected to be high.

Microcells typically consist of a group of base stations located along a busy road at 200–500 meter spacing. In the region between such a microcell and a macrocell, i.e. at the end of the road or at a turning onto another road, or between two microcells, there is a requirement for a handover.

There are at least two methods by which handover initiation is currently achieved. These are discussed in an article entitled "A handoff control process for microcellular systems" by T. Kanai and Y. Furuya, Proceedings of 38th IEEE Vehicular Technology Conference, 1988, pp. 170–175.

The first is by signal strength measurements. The base station monitors the received signal level. If the signal falls below a given threshold (or below the level of the target base station—as in the case of using relative signal strength measurement) the base station informs a central mobile switching center (MSC) that a handover to an adjacent cell is imminent.

The MSC then commands each of the surrounding base stations to measure the signal level they receive from the same mobile unit. Alternatively, the mobile unit reports continually the received signal level to the base station. The results of this are then polled and the MSC nominates which base station is to be allocated the call. The mobile unit is then commanded, via the old base station, to change to the new channel set up on the new base station.

The other method of determining when a handover should occur is by relative distance measurement based on signal delay. For example, in one known system there is a time division multiple access (TDMA) control channel. The base station transmits data to a mobile unit in timeslot 0 and receives data from the mobile unit in response some time later in, say, timeslot 3. The soliciting data sent by the base station will be received at the mobile unit after a small delay, dt. The mobile unit will then transmit to the base station in timeslot 3, which again will experience a small delay due to propagation time. The base station will expect to receive data exactly 3 slots later than it transmitted the soliciting data to the mobile unit. However, due to the delay incurred it will be received 2×dt later than expected. By measuring accurately the difference between expected and actual receipt of the solicited response, the distance of the mobile unit from the base station can be derived as it will be proportional to half the total delay.

In practice, the measurement of distance in a conventional cellular TDMA system between a mobile unit and its serving base station is hampered by inaccuracies due, mainly, to the lack of direct signal path. A received signal arriving at a mobile unit has usually undergone multiple reflections which will have lengthened the delay. This limits the usefulness of delay measurement in conventional cellular radio systems.

In a mixed cellular system comprising both macrocells and microcells it is desirable that microcells absorb as much traffic as possible. When a mobile unit served by a macrocell enters the coverage area of a microcell it may well be that the signal level for the macrocell base station remains sufficiently high for acceptable communications. However, it is more efficient for the system to off-load calls handled by the macrocell to a microcell whenever appropriate. It may, therefore, be difficult to decide when a handover procedure should be initiated based solely on the received signal level criteria. Furthermore, there may be situations in which it would be better to maintain the macrocell communication link with the mobile unit without initiating a handover. For example, it is not necessary to perform a handover when a mobile unit travels across a microcell for only a short period.

SUMMARY OF THE INVENTION

As a mobile unit approaches a microcell base station, the signal level increases. The applicant has found that if the mobile unit is approaching the base station along a direct course, at any instant there is a characteristic combination of delay (distance) measurement and a measured signal level that can be used to establish along which path the mobile unit is travelling. For a given distance measurement each path, i.e. street, will exhibit a different level of attenuation of the same signal. The combination of distance and signal level measurement thus enables the base station to determine the path.

It is an object of the present invention to provide a location determination system for a mobile radio network which is able, with the aid of stored information on signal characteristics and the estimated distance, to determine the location of a mobile unit within a microcell.

According to the present invention there is provided a system for determining the location of a mobile unit in a micro-cellular radio network having a plurality of base stations each providing radio coverage over a respective micro-cell and able to communicate with mobile units within the respective micro-cell, the system comprising:

means for storing in respect of each of one or more locations a corresponding order pair of measured distance and measured signal characteristic associated with that location;

means for forming a current order pair for a mobile unit comprising means for determining a current distance of a mobile unit from a base station and means for measuring a current characteristic of a radio signal transmitted between a mobile unit and a base station; and means for comparing the or each stored order pair with the mobile units current order pair so that the mobile units current location can be identified.

The invention also extends to a method for determining the location of a mobile unit in a micro-cellular radio network having a plurality of base stations each providing radio coverage over a respective micro-cell and able to communicate with mobile units within the respective micro-cell, the method comprising:

storing in respect of each of one or more locations a corresponding order pair of measured distance and measured signal characteristic associated with that location;

forming a current order pair for a mobile unit by determining a current distance of a mobile unit from a base station and measuring a current characteristic of a radio signal transmitted between a mobile unit and a base station; and comparing the or each stored order pair with the mobile units current order pair so that the mobile units current location can be identified.

Thus, the location determination uses the stored signal characteristic information, the measured received signal characteristics and the estimated distance to determine the location of a mobile unit within a cell.

As mentioned above, the invention is particularly applicable to location determination in a microcell.

The invention also extends to a base station for a mobile radio network including receiving means for receiving a signal; control means for controlling calls to and from mobile units; means for determining the distance of the mobile unit from the base station; means storing a set of signal characteristics of at least one possible mobile unit path in the area around the base station, each constituent of the set being associated with a location on the path; means for determining the presence of a constituent of the set of the signal characteristics in the received signal; and means for combining the distance information with the presence of the said constituent to identify the location of the mobile unit on a particular path based on the stored information; and means for initiating a handover from the base station to another base station on the basis of the location determination.

Also according to the invention there is provided a handover determination system for a cellular radio network, comprising a system according to the invention for determining the location of a mobile unit within the cell. The invention also extends to a cellular radio system including the above handover system.

BRIEF DESCRIPTION OF THE DRAWINGS

The present invention can be put into practice in various ways one of which will now be described by way of example with reference to the accompanying drawings in which.

DETAILED DESCRIPTION OF EXEMPLARY EMBODIMENTS

In the microcell or a cellular radio system network it is very often the case that the direct line of sight or dominant signal path between a microcell base station and a mobile unit exists, for example down a straight road. The round trip propagation delay for a distance of 100 meters between base station and mobile unit is about 0.3 microseconds. This is about 1/10th of the bit period which is typically 3.69 microseconds. It is possible for base station receivers to resolve delays of this size. A typical 900 MHz cellular receiver in a base station of a cellular network intended for transceiving high bit rate data can cope with at least 1–2 Mbit/s transmission rates.

As explained above when, for example, a mobile unit served by a macrocell enters the coverage area of a microcell under the macrocell it may be that the signal level from the macrocell base station remains sufficiently powerful for adequate communications. However, it is preferable to keep as much traffic as possible on the microcells. It is, therefore, difficult for a base station to decide on the initiation of the handover process based solely on the received signal criteria. Conversely, there are situations in which it would be better to maintain a communications link between the macrocell and the mobile unit.

Figure 3:
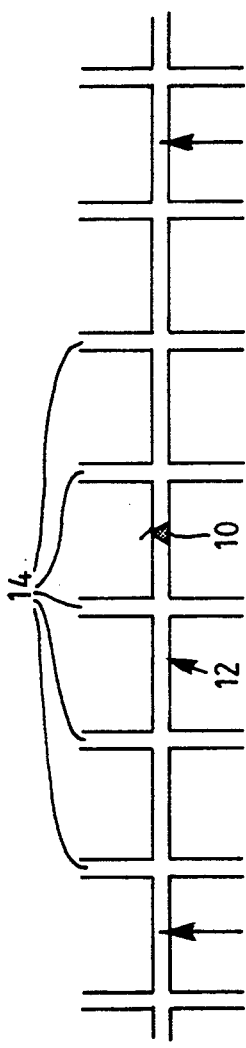
FIG. 3 is a plan of the streets whose profiles appear in FIG. 2.

Referring to FIG. 3, a microcell base station 10 is set up along a main straight road 12. The surrounding streets 14 which cross the main road 12 in a grid pattern are covered by a larger macrocell.

It has been found that the signal level profile of a signal transmitted to the mobile unit from the base station of the microcell along the main road 12 is distinctly different from the signal level profiles of signals received by mobile units travelling along the side roads crossing the microcells.

Figure 1A:
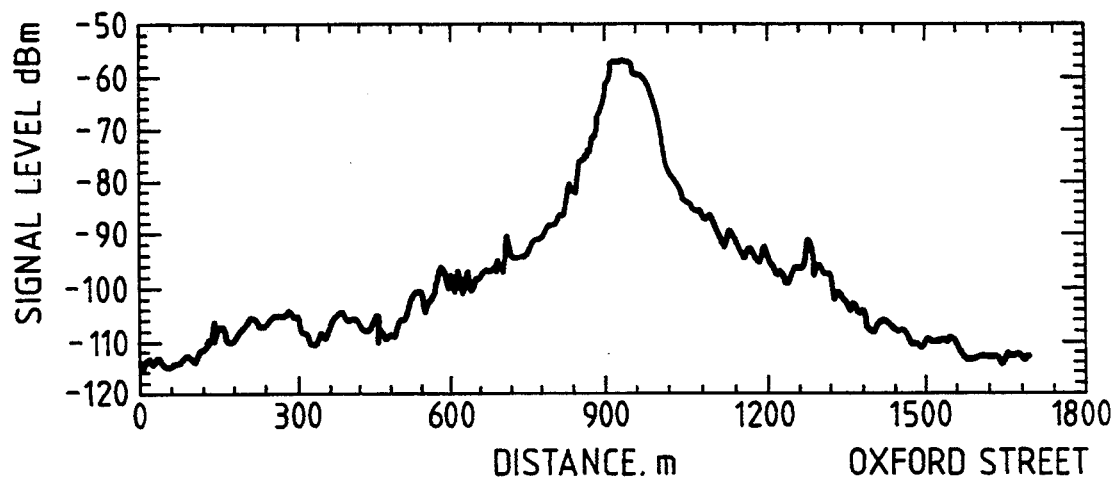
FIGS. 1(a) and (b) are graphs of signal level profiles of two intersecting streets.
Figure 1B:
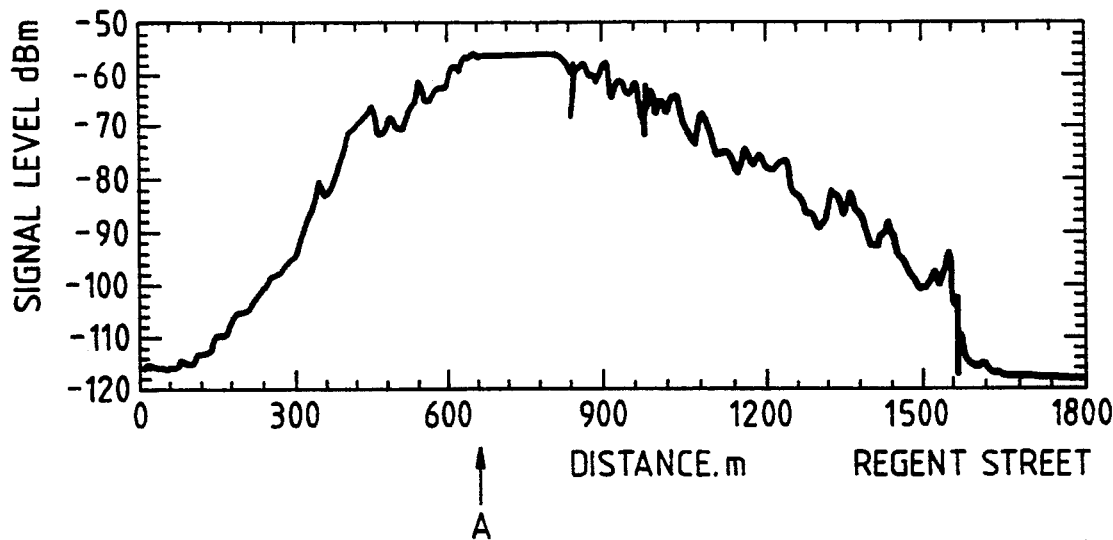

The difference between the signal profiles of the microcell main road 12 and those streets 14 in the macrocell is illustrated in FIG. 1 in which FIG. 1(a) illustrates the microcell signal profile along Oxford Street in London and FIG. 1(b) illustrates the signal profile for signals received by the mobile unit travelling along Regent Street in which the microcell base station is installed in the position indicated by the arrow A in the drawing.

In this particular arrangement, the base station is placed about 10 meters south of Oxford Circus along Regent Street. The base station antenna is a Yagi array mounted at 6 meters above the ground transmitting at a power level of 16 dBm at 900 MHz. It will be seen from the two graphs that the average signal levels along Regent Street are substantially higher than those along Oxford Street for equivalent distances from the microcell base station.

Figure 2:
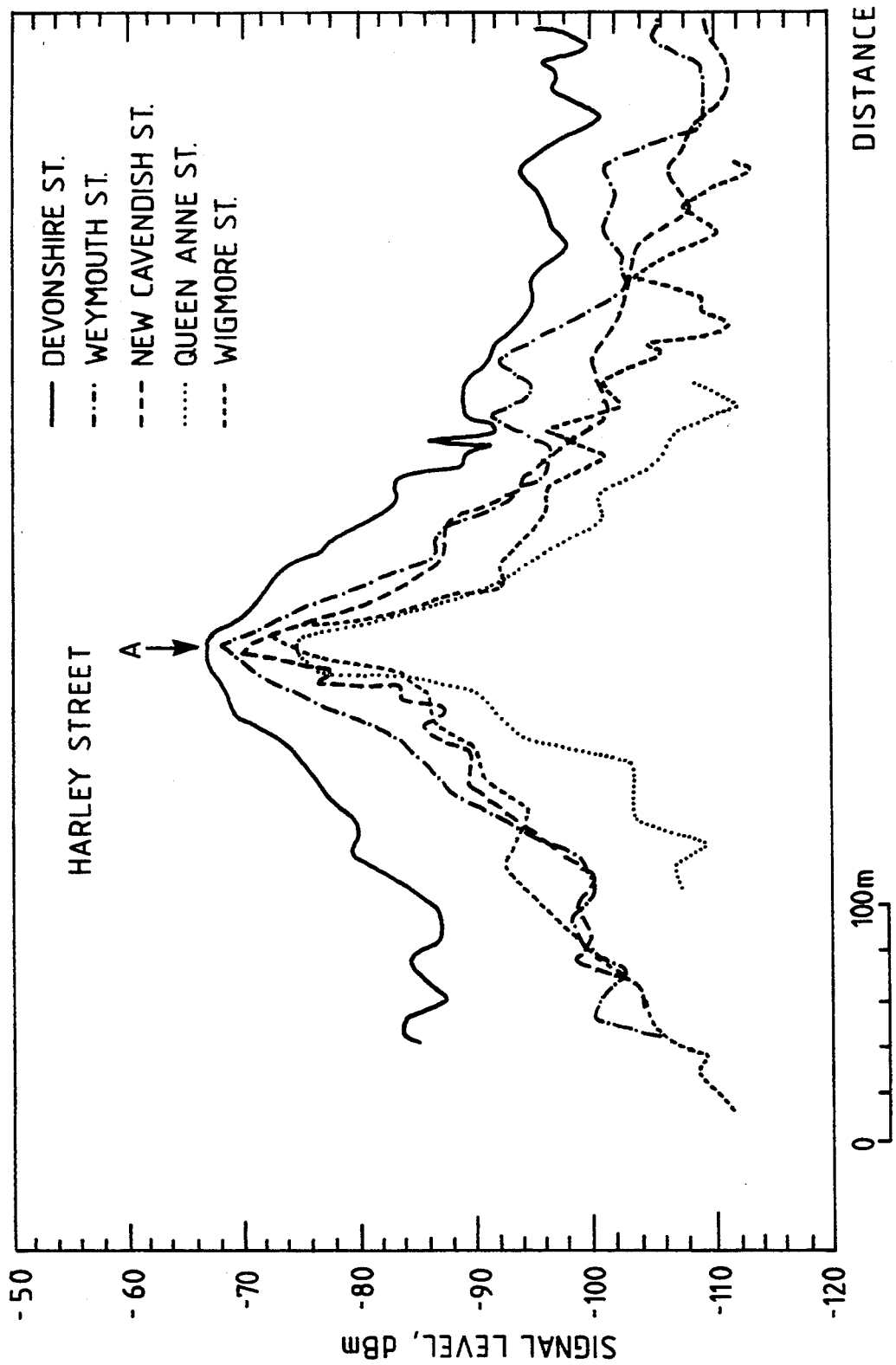
FIG. 2 is a graph of signal level profiles of streets crossing a microcell boundary.

In FIG. 2 the signal level profiles for a further group of London streets is illustrated for a microcell base station established on Harley Street in which the location of the microcell base station is indicated by the arrow A. These bear out the above. Furthermore, it is clear from a comparison of the profiles for these streets that they are all significantly different from each other. The differences are due mainly to the path loss from the microcell base station to each junction and the losses due to diffraction around the edge of buildings. This diffraction loss has been established at around 20 dB per street corner.

The unique characteristic of the signal profile received by a mobile unit at a particular street enables the determination of the street location of that unit. The order pairs of distance and signal strength at different profiles of relevant possible paths, i.e. streets (or parts of streets) covered by microcells, are stored in digital form in look-up tables at the microcell or macrocell base station.

In order to determine the location of a mobile unit to a point on a street the base station needs information on the distance of the mobile unit from the base station and the signal strength received by the mobile unit. It is then able to compare this information with the various profiles in the look-up table to obtain a match. The order pair of distance and signal strength will have a match on a corresponding one of the street profiles.

To determine distance, the base station performs a propagation delay test by monitoring the timing advance required to allow for propagation delay.

To determine the signal strength, a received signal strength indication is transmitted from the mobile unit to the base station. This may be part of a routine package of information sent by the mobile unit or in response to a specific solicitation from the base station.

Figure 4:
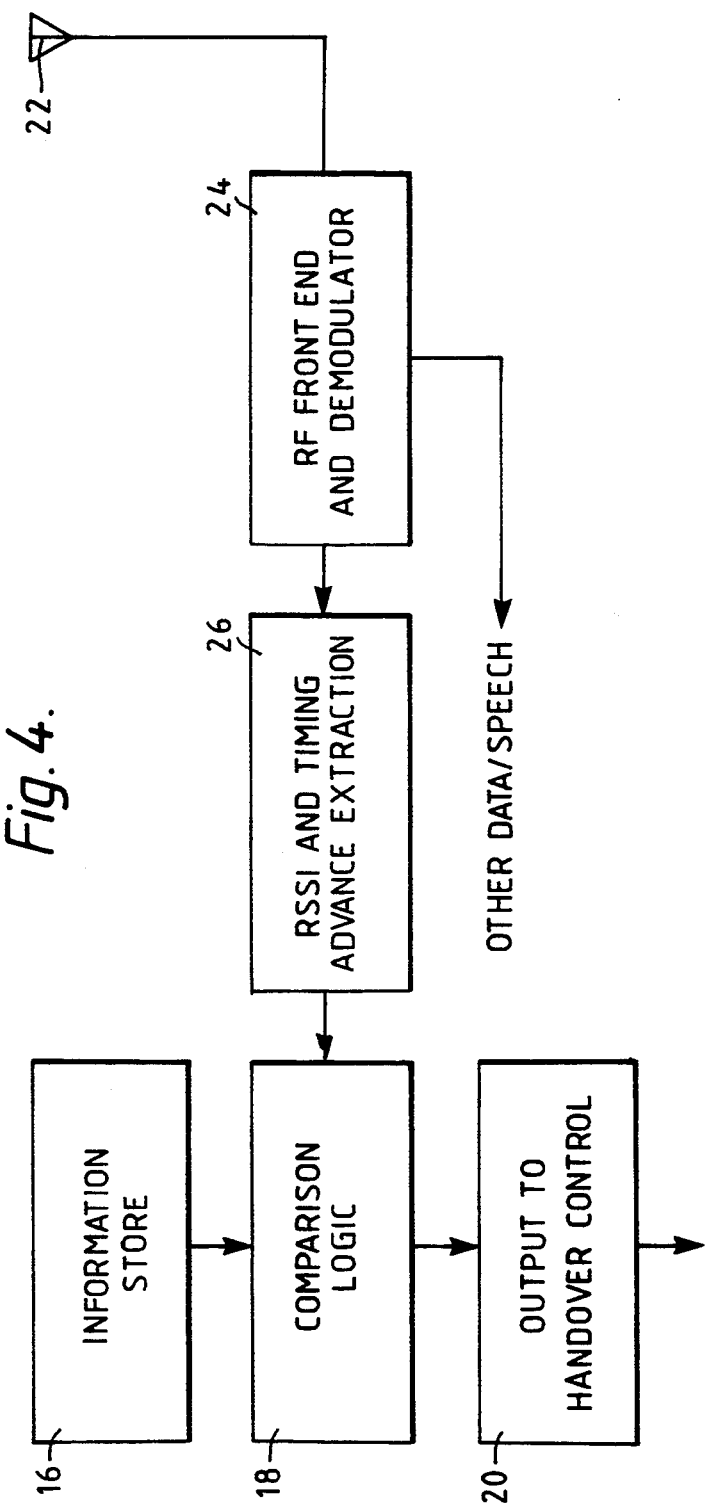
FIG. 4 is a block diagram of the relevant parts of a base station receiver for the invention.

Referring to FIG. 4, the base station requires a data storage unit or, at least access to a data storage unit 16 in order to store order pair data of paths in its coverage area. The data takes the form of order pairs of signal strength and distance (i.e. timing advance). The mobile unit reports the signal level measurement and the timing advance is calculated by the base station. The information is compared with the stored order pairs by means of comparator logic 18, with the stored information to determine the location of the mobile unit within the microcell and, if the handover criteria are satisfied (assuming the mobile unit is currently being served by the base station) the handover sequence is initiated by a handover initiation output controller 20 depending on the location determination made.

If the mobile unit is approaching a microcellular network, i.e. it is still within the macrocellular network, the mobile unit tunes momentarily to the control channel of the potential target microcell base station. Synchronisation with the TDMA control channel in question is not a problem as the microcells are, in any event, derived from a parent macrocell base station controller with an associated specific macrocell coverage area. Thus, all microcell base stations in a particular macrocell coverage area are in synchronisation anyway.

The radio signal received by the base station is fed from a receiver antenna 22 to a conventional radio frequency receiver front end and signal demodulator 24. From this signal the necessary received signal strength measurement and timing advance calculation is performed also in conventional manner by a signal strength and delay measuring apparatus 26.

It is the results of the received signal strength and time advance measurements that are compared in the comparator logic with the stored order pairs.

On the basis of the comparison the comparator logic 18 is then also able to determine if the criteria specific to a handover initiation have been satisfied. In the case that it is satisfied the handover procedure is initiated by means of the output controller 20. The initiation involves the base station seizing a high priority associated control channel and downloading the details of the target microcell to which transfer is to be effected to the mobile unit. At the same time set-up information is also sent to the target microcell base station in preparation for handover.

Thus, if a mobile unit is approaching the microcell along a direct course, at any particular instant there is a unique combination of delay and average signal level. If the base station is programmed to recognise this particular combination, handover from the macrocell to the microcell is initiated immediately. On the other hand, if the mobile unit approaches the microcell from a side road, for the same signal delay from the microcell base station there is a substantially lower signal level. This difference is typically around 20 dB or more. If the microcell base station is programmed to ignore this combination of delay and average signal level, the mobile unit will be able to traverse the street constituting the microcell without a brief handover to the microcell. In general, the handover criteria depend on the nature of the potential handover itself. As it is the purpose of the system to handover from a macrocell to a microcell whenever appropriate to maintain the efficiency of the system, this direction of handover will be more readily effected than vice versa.

However, if the mobile unit turns from a side street onto the main road, it will be detected by the next microcell in the main road towards which it moves. As it gets closer to this next microcell base station a handover can then be effected to transfer that mobile unit to the microcell.

Of course, there will be situations in which there is a high probability that a turn from a side street to the main road bearing the microcell will be effected. In this case the characteristics of the side street can be programmed into the microcell base station to initiate a handover.

It is important to place the microcell base station to best effect. In particular the starting point, (i.e. the location of the base station), of a microcell should be between two crossroads and not directly at a junction. This is illustrated in FIG. 3. By this positioning it is possible to eliminate the ambiguity of a mobile unit crossing the microcell measuring the same delay and signal level as one travelling along the main road bearing the microcell.

In order that the handover between a microcell and a macrocell is conducted as smoothly and as efficiently as possible it is preferable that the microcell base station and the macrocell base station are synchronised so that there is minimal delay in gaining the necessary synchronisation between the two to complete a handover spanning different layers of the cellular system. By different layers is meant different types of cells, i.e. microcell and macrocell. This is a relatively simple matter as microcell base stations will, in most circumstances, be under the direct supervision of a macrocell base station although operated independently. When the measurement of location and direction of travel along the microcell path are determined, the handover can be initiated immediately, if appropriate.

Another consideration is the reservation of a prioritised handover channel at the macrocell base station to enable fast handover from a microcell to the macrocell due to microcell to microcell handover failure. This amounts to a standby channel which is kept in reserve for such an eventuality.

It is also advantageous if the outer boundary of the macrocell overlaying a microcell, coincides with a microcell boundary. This avoids any ambiguity which might otherwise exist if a microcell were to straddle macrocell boundaries but define an area having its boundary not coincident with the macrocell boundary.

The system is directly applicable to handover between a microcell and a macrocell. However, the system is also equally applicable to microcell to microcell handover as well.

In microcell to microcell situations, the handover from one microcell base station to the next can be anticipated and appropriate information conveyed by one microcell base station to another prior to a mobile unit experiencing a critical boundary condition. By transmitting control information in anticipation of a handover, the actual handover process can be performed with minimal delay.

The handover system is designed to be complementary to existing microcell systems and does not require additional input from the cellular system mobile units. Thus, the mobile units do not need modification and the system development is located entirely within the macrocell and microcell management. However, it is also possible to use an intelligent mobile unit which is able to interrogate the base station, i.e. the base station downloads the information to the mobile unit which determines the requirements for handover, and informs the base station accordingly. The base station is then able to act on the information when it is transmitted to it.

If higher reliability is required of the handover determination, for example in the case of data transmission, additional handover criteria could be introduced. One example of this is to cater for slow moving pedestrian mobile units. This may be done by recognising that the mobile unit has detected a microcell base station for a predetermined excess period while travelling along a side street under the control of a macrocell. In this case, the handover may usefully be effected while the mobile unit is traversing the main road served by the microcell.

I claim:

1. A system for determining the location of a mobile unit in a micro-cellular radio network having a plurality of base stations each providing radio coverage over a respective micro-cell and able to communicate with mobile units within the respective micro-cell, the system comprising:
    means for storing with respect to each of one or more locations a corresponding order pair of measured distance and measured signal characteristic associated with that location;
    means for forming a current order pair for a mobile unit including means for determining a current distance of a mobile unit from a base station and means for measuring a current characteristic of a radio signal transmitted between a mobile unit and a base station; and
    means for comparing a stored order pair with a current order pair for the mobile unit to determine the current location of the mobile unit.

2. A system as in claim 1 in which the measured signal characteristic includes the signal power.

3. A system as in claim 1 in which the means for storing store a set of signal power profiles for each of a plurality of possible mobile unit paths.

4. A system as in claim 1, in which the distance determining means include means for analysing the propagation delay of a signal under test transmitted between the mobile unit and the base station.

5. A system as claimed in claim 1 in which the means for determining distance, the means for storing, the means for measuring a signal characteristic, the means for forming an order pair and the means for comparing are associated with the base station, the signal received by the means for measuring a signal characteristic being received from the mobile unit.

6. A system as in claim 5 in which the signal is transmitted from the mobile unit to the base station in response to an initiation signal transmitted from the base station to the mobile unit.

7. A system as in claim 1 included as part of a handover determination system for a cellular radio network.

8. A system as in claim 7 including means for executing a predefined handover, based on a particular result of the location determination, between cells.

9. A system as in claim 7 including means for inhibiting a handover, based on a particular result of the location determination when the mobile unit has passed into another cell.

10. A base station for a mobile radio network including:
    receiving means for receiving a signal;
    control means for controlling calls to and from mobile units;
    means for determining the distance of the mobile unit from the base station;
    means for storing a set of signal characteristics of at least one possible mobile unit path in the area around the base station, each constituent of the set being associated with a location on the path;
    means for determining the presence of a constituent of the set of signal characteristics in the received signal;
    means for combining the determined distance with the presence of said constituent to identify the location of the mobile unit on a particular path based on the stored set; and
    means for initiating a handover from one base station to another base station on the basis of the identified location.

11. A base station as in claim 10 in which the means for determining distance includes means for analysing the propagation delay of a signal under test transmitted between the mobile unit and the base station.

12. A base station as in claim 10 in which the means for storing a set of signal characteristics are arranged to store signal power values, constituting a signal power profile of the path.

13. A method for determining the location of a mobile unit in a micro-cellular radio network having a plurality of base stations each providing radio coverage over a respective micro-cell and able to communicate with mobile units within the respective micro-cell, the method comprising:
    storing with respect to each of one or more locations a corresponding order pair of measured distance and measured signal characteristic associated with that location;
    forming a current order pair for a mobile unit by determining a current distance of a mobile unit from a base station and measuring a current characteristic of a radio signal transmitted between a mobile unit and a base station; and comparing a stored order pair with a current order pair for the mobile unit to determine the current location of the mobile unit.

14. A method as in claim 13 in which the measured signal characteristic includes the signal power.

15. A method as in claim 13 including storing a set of signal power profiles as the set of signal characteristics for each of a plurality of possible mobile unit paths.

16. A method as in claim 13 in which the distance of the mobile unit is determined by analysing the propagation delay of a signal under test transmitted between the mobile unit and the base station.

17. A method as in claim 13 in which the signal is transmitted by the mobile unit to the base station.

18. A method as in claim 17, in which the signal is transmitted from the mobile unit to the base station in response to an initiation signal transmitted from the base station to the mobile unit.

19. A method for determining the location of a mobile radio transceiver with respect to a fixed base station radio transceiver in a cellular radio-telephone network, said method comprising the steps of:

measuring the relative signal propagation time between said mobile and fixed base radio transceivers;

measuring a further signal characteristic for signals propagated between said mobile and fixed base radio transceivers; and processing said measured signal propagation time and said measured further signal characteristic with predetermined and pre-stored data to determine the location of the mobile radio transceiver.

20. A method as in claim 19 wherein said further signal characteristic includes received signal strength.

* * * * *